United States Patent
Nozaki

(10) Patent No.: US 9,688,815 B2
(45) Date of Patent: Jun. 27, 2017

(54) METHOD FOR PRODUCING POLYIMIDE PRECURSOR AND METHOD FOR PRODUCING POLYIMIDE

(71) Applicant: Chiyoshi Nozaki, Shizuoka (JP)

(72) Inventor: Chiyoshi Nozaki, Shizuoka (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/892,643

(22) PCT Filed: May 19, 2014

(86) PCT No.: PCT/JP2014/063759
§ 371 (c)(1),
(2) Date: Nov. 20, 2015

(87) PCT Pub. No.: WO2014/192665
PCT Pub. Date: Dec. 4, 2014

(65) Prior Publication Data
US 2016/0122474 A1 May 5, 2016

(30) Foreign Application Priority Data

May 27, 2013 (JP) .................. 2013-110739
Feb. 4, 2014 (JP) .................. 2014-019732

(51) Int. Cl.
| C08G 73/10 | (2006.01) |
| C08G 69/28 | (2006.01) |
| C08L 77/06 | (2006.01) |
| C08L 79/08 | (2006.01) |

(52) U.S. Cl.
CPC ......... *C08G 73/1028* (2013.01); *C08G 69/28* (2013.01); *C08G 73/10* (2013.01); *C08G 73/105* (2013.01); *C08G 73/1021* (2013.01); *C08G 73/1032* (2013.01); *C08G 73/1067* (2013.01); *C08G 73/1071* (2013.01); *C08L 77/06* (2013.01); *C08L 79/08* (2013.01); *C08J 2203/08* (2013.01); *Y10T 428/31721* (2015.04)

(58) Field of Classification Search
CPC ............ Y10T 428/31721; C08G 73/10; C08G 73/1028; C08G 69/28; C08J 2203/08; C08L 77/06
See application file for complete search history.

(56) References Cited

U.S. PATENT DOCUMENTS

| 2012/0277401 A1 | 11/2012 | Kang et al. |
| 2013/0289156 A1 | 10/2013 | Hayashi |
| 2014/0038424 A1 | 2/2014 | Horikawa et al. |
| 2014/0200326 A1 | 7/2014 | Yamauchi et al. |

FOREIGN PATENT DOCUMENTS

| CN | 1 02 76 62 60 A | 11/2012 |
| CN | 102766260 | * 11/2012 |
| JP | 2010-189524 | 9/2010 |
| JP | 2011-038024 | 2/2011 |
| JP | 2012-007161 | 1/2012 |
| JP | WO2012/081615 A1 | 6/2012 |
| JP | 2012-194369 | 10/2012 |
| JP | 2013-516508 | 5/2013 |
| JP | 2013-189610 | 9/2013 |
| JP | 2013-224398 | 10/2013 |
| JP | 2014-033056 | 2/2014 |

OTHER PUBLICATIONS

International Search Report Issued Aug. 19, 2014 for counterpart International Patent Application No. PCT/JP2014/063759 filed May 19, 2014.
Ishizaka Takayuki, et al., Green Synthetic Method and Simple Size-control of Polyimide Nanoparticles in ScCO2, Chemistry Letters, Jul. 16, 2011, vol. 40, No. 8, p. 849-851.
Apr. 8, 2016 European Search Report in corresponding European Patent Application No. EP 14804881.2.

* cited by examiner

*Primary Examiner* — Gregory Listvoyb
(74) *Attorney, Agent, or Firm* — Cooper & Dunham LLP

(57) ABSTRACT

A method for producing a polyimide precursor, including: reacting tetracarboxylic dianhydride represented by the following General Formula (1) with a diamine compound represented by the following General Formula (2) in a compressive fluid to thereby produce a polyimide precursor represented by the following Formula (3):

<General Formula (1)>

H₂N—Y—NH₂ <General Formula (2)>

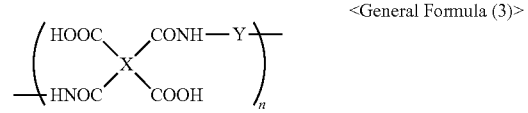

<General Formula (3)> where, X in the General Formulae (1) and (3) denotes a tetravalent aromatic group or a tetravalent alicyclic group, Y in the General Formulae (2) and (3) denotes a divalent organic group, and n denotes the number of repetitions.

4 Claims, 3 Drawing Sheets

METHOD FOR PRODUCING POLYIMIDE PRECURSOR AND METHOD FOR PRODUCING POLYIMIDE

TECHNICAL FIELD

The present invention relates to a method for producing a polyimide precursor and a method for producing polyimide.

BACKGROUND ART

Polyimide has been utilized in, for example, a resin for electronic components, a heat-resistant resin, and an abrasion-resistant resin, because it is excellent in chemical stability and thermal stability, and has high mechanical strength. However, the polyimide has a problem in difficulty of processing into a membrane or a film. Therefore, tetracarboxylic dianhydride is subjected to polyaddition reaction with a diamine compound in a high boiling point solvent to thereby obtain a solution of polyamic acid (polyimide precursor). The resultant solution is applied onto a substrate, followed by heating at a high temperature of about 400° C. to thereby imidate the polyamic acid. Then, the solvent is removed to thereby produce a polyamide film. However, there has been a limit to generic use of a polyimide precursor and polyimide.

There has been proposed a method for producing polyimide particles by dissolving polyamic acid into a solvent in which polyimide is insoluble, followed by imidating the polyamic acid with an imidating agent in a high-pressure container filled with carbon dioxide at a pressure of 5 MPa to 30 MPa (see PTL 1).

There also has been proposed a method for producing polyimide particles by mixing a good solvent of polyamic acid with a poor solvent of polyamic acid on a substrate to thereby produce a precipitate (see PTL 2).

However, in these proposed methods, there is a problem that a solvent or an impurity adversely remains in the produced polyamide precursor and polyimide.

Therefore, there has been a demand to provide a method for producing a polyimide precursor capable of efficiently producing a high-quality polyimide precursor containing only a small amount of a residual solvent and impurity.

CITATION LIST

Patent Literature

PTL 1 Japanese Patent Application Laid-Open (JP-A) No. 2010-189524
PTL 2 JP-A No. 2011-038024

SUMMARY OF INVENTION

Technical Problem

An object of the present invention is to provide a method for producing a polyimide precursor capable of efficiently producing a high-quality polyimide precursor containing only a small amount of a residual solvent and impurity.

Solution to Problem

A means for solving the aforementioned problems is as follows:

A method for producing a polyimide precursor, including: reacting tetracarboxylic dianhydride represented by the following General Formula (1) with a diamine compound represented by the following General Formula (2) in a compressive fluid to thereby produce a polyimide precursor represented by the following Formula (3):

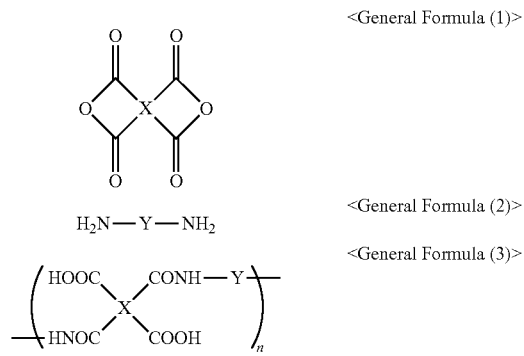

where, X in the General Formulae (1) and (3) denotes a tetravalent aromatic group or a tetravalent alicyclic group, Y in the General Formulae (2) and (3) denotes a divalent organic group, and n denotes the number of repetitions.

Advantageous Effects of Invention

The present invention can solve the above existing problems, can achieve the object, and can provide a method for producing a polyimide precursor capable of efficiently producing a high-quality polyimide precursor containing only a small amount of a residual solvent and impurity.

Figure 1:
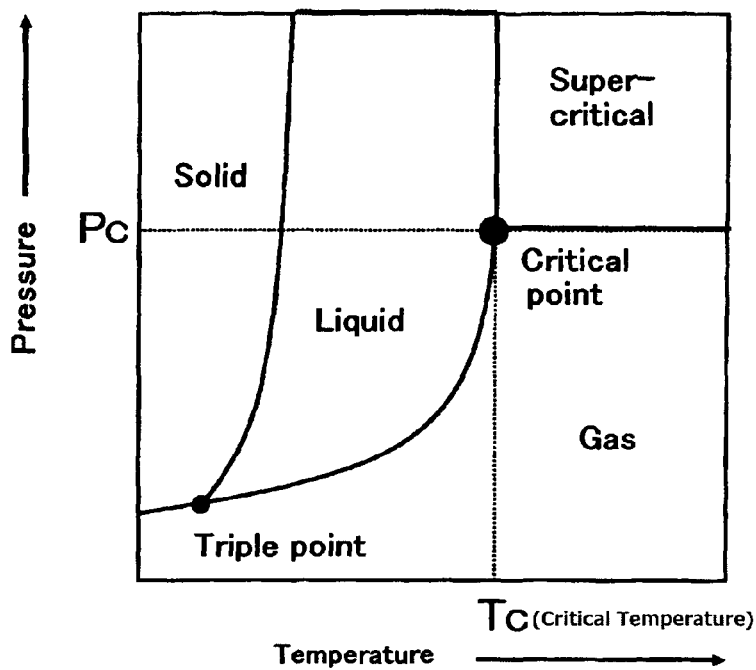
FIG. 1 is a general phase diagram depicting the state of a substance depending on pressure and temperature conditions.

DESCRIPTION OF EMBODIMENTS (Production Method of Polyimide Precursor)

A method for producing a polyimide precursor of the present invention includes reacting tetracarboxylic dianhydride represented by the following General Formula (1) with a diamine compound represented by the following General Formula (2) in a compressive fluid to thereby produce a polyimide precursor represented by the following Formula (3):

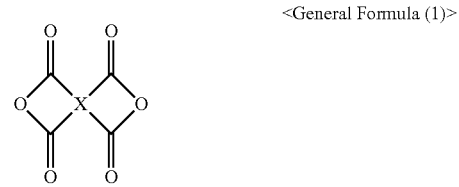

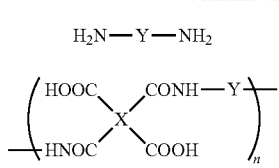
<General Formula (2)>

<General Formula (3)> where, X in the General Formulae (1) and (3) denotes a tetravalent aromatic group or a tetravalent alicyclic group, Y in the General Formulae (2) and (3) denotes a divalent organic group, and n denotes the number of repetitions.

The X in the General Formulae (1) and (3) denotes a tetravalent aromatic group or a tetravalent alicyclic group.

Example of the tetravalent aromatic group includes a group represented by any of the following Structural Formulae.

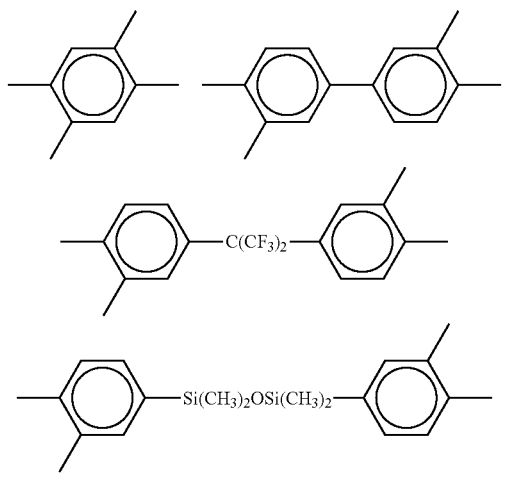

Examples of the tetravalent alicyclic group include cyclobutane, cyclopentane, cyclohexane, and dicyclohexylmethane.

The Y in the General Formulae (2) and (3) denotes a divalent organic group.

Examples of the divalent organic group include a group represented by any of the following Structural Formulae.

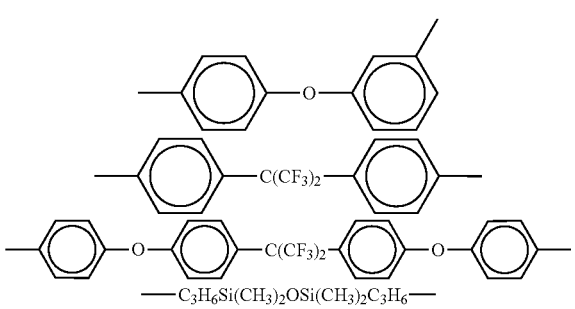

The n in the General Formula (3) denotes the number of repetitions, and is preferably an integer of 1 or more, more preferably 5 or more. An upper limit of n is preferably 2,000 or less.

The tetracarboxylic dianhydride represented by the General Formula (1) is not particularly limited and may be appropriately selected depending on the intended purpose. Examples thereof include fluorine-containing tetracarboxylic dianhydride, fluorine-free tetracarboxylic dianhydride, and siloxane-containing tetracarboxylic dianhydride. These may be used alone or in combination.

The fluorine-containing tetracarboxylic dianhydride is not particularly limited and may be appropriately selected depending on the intended purpose. Examples thereof include (trifluoromethyl)pyromellitic dianhydride, bis(trifluoromethyl)pyromellitic dianhydride, 5,5'-bis(trifluoromethyl)-3,3',4,4'-tetracarboxybiphenyl dianhydride, 2,2',5,5'-tetrakis(trifluoromethyl)-3,3',4,4'-tetracarboxybiphenyl dianhydride, 5,5'-bis(trifluoromethyl)-3,3',4,4'-tetracarboxydiphenyl ether dianhydride, 5,5'-bis(trifluoromethyl)-3,3',4,4'-tetracarboxybenzophenone dianhydride, bis[(trifluoromethyl)dicarboxyphenoxy]benzene dianhydride, bis[(trifluoromethyl)dicarboxyphenoxy]biphenyl dianhydride, bis[(trifluoromethyl)dicarboxyphenoxy](trifluoromethyl)benzene dianhydride, bis[(trifluoromethyl)dicarboxyphenoxy]bis(trifluoromethyl)biphenyl dianhydride, bis[(trifluoromethyl)dicarboxyphenoxy]diphenyl ether dianhydride, bis(dicarboxyphenoxy)(trifluoromethyl)benzene dianhydride, bis(dicarboxyphenoxy)bis(trifluoromethyl)benzene dianhydride, bis(dicarboxyphenoxy)tetrakis(trifluoromethyl)benzene dianhydride, bis(dicarboxyphenoxy)bis(trifluoromethyl)biphenyl dianhydride, bis(dicarboxyphenoxy)tetrakis(trifluoromethyl)biphenyl dianhydride, 2,2-bis(3,4-dicarboxyphenyl)hexafluoropropane dianhydride, 2,2-bis[4-(3,4-dicarboxyphenoxy)phenyl]hexafluoropropane dianhydride, 1,4-difluoropyromellitic dianhydride, 1-trifluoromethyl-4-fluoropyromellitic dianhydride, 1,4-di(trifluoromethyl)pyromellitic dianhydride, 1,4-di(pentafluoroethyl)pyromellitic dianhydride, hexafluoro-3,3',4,4'-biphenyltetracarboxylic dianhydride, hexafluoro-3,3',4,4'-benzophenone tetracarboxylic dianhydride, 2,2-bis(3,4-dicarboxytrifluorophenyl)hexafluoropropane dianhydride, 1,3-bis(3,4-dicarboxytrifluorophenyl)hexafluoropropane dianhydride, 1,4-bis(3,4-dicarboxytrifluorophenoxy)tetrafluorobenzene dianhydride, and hexafluoro-3,3'(or 4,4')-oxybisphthalic dianhydride. These may be used alone or in combination.

The fluorine-free tetracarboxylic dianhydride is not particularly limited and may be appropriately selected depending on the intended purpose. Examples thereof include pyromellitic dianhydride, 3,3',4,4'-tetracarboxybiphenyl dianhydride, 2,3,3',4'-tetracarboxybiphenyl dianhydride, 3,3',4,4'-tetracarboxydiphenyl ether dianhydride, 2,3,3',4'-tetracarboxydiphenyl ether dianhydride, 3,3',4,4'-tetracarboxybenzophenone dianhydride, 2,3,3',4'-tetracarboxybenzophenone dianhydride, 2,3,6,7-tetracarboxynaphthalene dianhydride, 1,4,5,8-tetracarboxynaphthalene dianhydride, 1,2,5,6-tetracarboxynaphthalene dianhydride, 3,3',4,4'-tetracarboxydiphenylmethane dianhydride, 2,2-bis(3,4-dicarboxyphenyl)propane dianhydride, 3,3',4,4'-tetracarboxydiphenylsulfone dianhydride, 3,4,9,10-tetracarboxyperylene dianhydride, 2,2-bis[4-(3,4-dicarboxyphenoxy)phenyl]propane dianhydride, 1,3-bis(3,4-dicarboxyphenyl)-1,1,3,3-tetramethyldisiloxane dianhydride, p-terphenyl-3,4,3'',4''-tetracarboxylic dianhydride, and m-terphenyl-3,4,3'',4''-tetracarboxylic dianhydride. These may be used alone or in combination.

Examples of the siloxane-containing tetracarboxylic dianhydride include bis(3,4-dicarboxyphenyl)tetramethylsiloxane dianhydride.

Examples of the diamine compound represented by the General Formula (2) include a fluorine-containing diamine compound, a fluorine-free diamine compound, and a siloxane-containing diamine compound. These may be used alone or in combination.

The fluorine-containing diamine compound is not particularly limited and may be appropriately selected depending on the intended purpose. Examples thereof include diaminobenzotrifluoride, bis(trifluoromethyl)phenylenediamine, diaminotetra(trifluoromethyl)benzene, diamino(pentafluoroethyl)benzene, 2,2'-bis(trifluoromethyl)benzidine, 3,3'-bis(trifluoromethyl)benzidine, 2,2'-bis(trifluoromethyl)-4,4'-diaminodiphenyl ether, 3,3'-bis(trifluoromethyl)-4,4'-diaminodiphenyl ether, 3,3',5,5'-tetrakis(trifluoromethyl)-4,4'-diaminodiphenyl ether, 3,3'-bis(trifluoromethyl)-4,4'-diaminobenzophenone, bis(aminophenoxy)di(trifluoromethyl)benzene, bis(aminophenoxy)tetrakis(trifluoromethyl)benzene, bis[(trifluoromethyl)aminophenoxy]benzene, bis[(trifluoromethyl))aminophenoxy]biphenyl, bis{[(trifluoromethyl))aminophenoxy]phenyl}hexafluoropropane, 2,2-bis{4-(p-aminophenoxy)phenyl}hexafluoropropane, 2,2-bis{4-(m-aminophenoxy)phenyl}hexafluoropropane, 2,2-bis{4-(o-aminophenoxy)phenyl}hexafluoropropane, 2-{4-(p-aminophenoxy)phenyl}-2-{4-(m-aminophenoxy)phenyl}hexafluoropropane, 2-{4-(m-aminophenoxy)phenyl}-2-{4-(o-aminophenoxy)phenyl}hexafluoropropane, 2-{4-(o-aminophenoxy)phenyl}-2-{4-(p-aminophenoxy)phenyl}hexafluoropropane, 3,4,5,6-tetrafluoro-1,2-phenylenediamine, 2,4,5,6-tetrafluoro-1,3-phenylenediamine, 2,3,5,6-tetrafluoro-1,4-phenylenediamine, 4,4'-diaminooctafluorobiphenyl, bis(2,3,5,6-tetrafluoro-4-aminophenyl)ether, bis(2,3,5,6-tetrafluoro-4-aminophenyl)sulfone, and hexafluoro-2,2'-bis(trifluoromethyl)-4,4'-diaminobiphenyl. These may be used alone or in combination.

The fluorine-free diamine compound is not particularly limited and may be appropriately selected depending on the intended purpose. Examples thereof include m-phenylenediamine, p-phenylenediamine, benzidine, 4,4"-diaminoterphenyl, 4,4-diaminoquaterphenyl, 4,4'-diaminodiphenyl ether, 4,4'-diaminodiphenylmethane, diaminodiphenylsulfone, 2,2-bis(p-aminophenyl)propane, 2,2-bis(p-aminophenyl)hexafluoropropane, 1,5-diaminonaphthalene, 2,6-diaminonaphthalene, 3,3'-dimethylbenzidine, 3,3'-dimethoxybenzidine, 3,3'-dimethyl-4,4'-diaminodiphenyl ether, 3,3'-dimethyl-4,4'-diaminodiphenylmethane, 1,4-bis(p-aminophenoxy)benzene, 4,4'-bis(p-aminophenoxy)biphenyl, and 2,2-bis{4-(p-aminophenoxy)phenyl}propane. These may be used alone or in combination.

The siloxane-containing diamine compound is not particularly limited and may be appropriately selected depending on the intended purpose. Examples thereof include bis(3-aminopropyl)tetramethyldisiloxane, bis(3-aminobutyl)tetramethyldisiloxane, bis(3-aminopropyl)tetrabenzyldisiloxane, and bis(3-aminopropyl)-1,1'-dibenzyl-2,2'-dimethyldisiloxane. These may be used alone or in combination.

In the method for producing the polyimide precursor, the compressive fluid preferably contains an active hydrogen-free tertiary amine from the viewpoint of acceleration of an imidation reaction.

The active hydrogen-free tertiary amine is not particularly limited and may be appropriately selected depending on the intended purpose. Examples thereof include triethylamine (TEA), tripropylamine, tributylamine, N-methylmorpholine, 1,4-diazabicyclo[2,2,2]octane (DABCO), diazabicycloundecene (DBU), N,N-dimethylaniline, and pyridine. These may be used alone or in combination.

The polyimide precursor represented by the General Formula (3) preferably includes a fluorine, a siloxane group, or both thereof from the viewpoint of good fitting to a supercritical fluid and coloration prevention of a polyimide resin.

Examples of the siloxane group include tetraalkyl disiloxane (e.g., tetramethyl disiloxane, tetraethyl disiloxane, and tetrapropyl disiloxane), tetraaralkyl disiloxane (e.g., tetrabenzyl disiloxane), and polydialkyl siloxane composed of two or more repeated dimethyl siloxane.

<Compressive Fluid>

Figure 2:
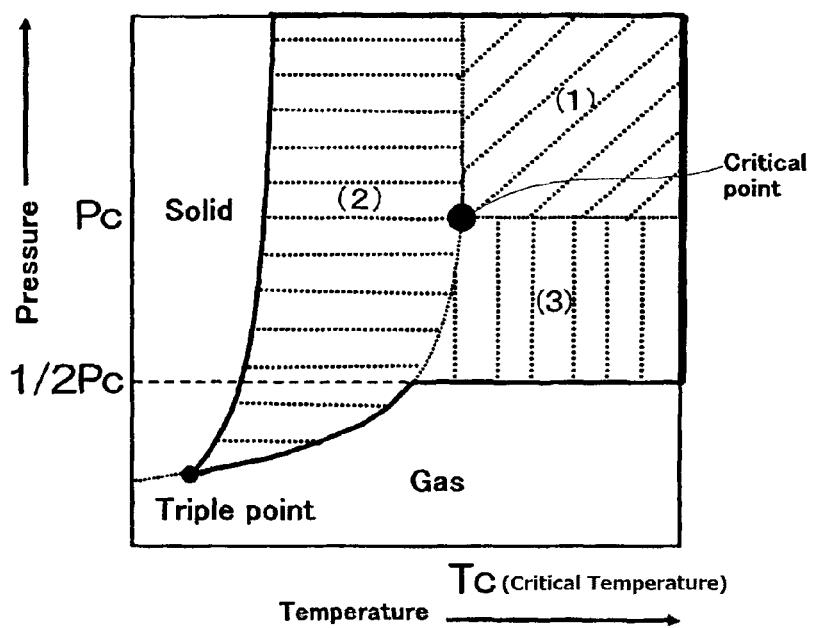
FIG. 2 is a phase diagram which defines a compressive fluid.

The compressive fluid will be explained with reference to FIGS. 1 and 2. FIG. 1 is a general phase diagram depicting the state of a substance depending on pressure and temperature conditions. FIG. 2 is a phase diagram which defines the compressive fluid.

The "compressive fluid" refers to a state of a substance present in any one of the regions (1), (2) and (3) of FIG. 2 in the phase diagram of FIG. 1.

The "compressive fluid" refers to a state of a fluid present in any one of the regions (1), (2) and (3) of FIG. 2 in the phase diagram of FIG. 1.

In such regions, the substance is known to have extremely high density and show different behaviors from those shown at normal temperature and normal pressure. Note that, the substance is a supercritical fluid when it is present in the region (1). The supercritical fluid is a fluid that exists as a non-condensable high-density fluid at temperature and pressure exceeding a limiting point (critical point) at which a gas and a liquid can coexist and that does not condense even when it is compressed. When the substance is in the region (2), the substance is a liquid, but in the present invention, it is a liquefied gas obtained by compressing a substance existing as a gas at normal temperature (25° C.) and normal pressure (1 atm). When the substance is in the region (3), the substance is in the state of a gas, but in the present invention, it is a high-pressure gas of which pressure is ½ or more of the critical pressure (Pc), i.e. ½ Pc or higher.

Examples of a substance constituting the compressive fluid include carbon monoxide, carbon dioxide, dinitrogen monooxide, nitrogen, methane, ethane, propane, 2,3-dimethylbutane, and ethylene. Among them, carbon dioxide is preferable because the critical pressure and critical temperature of carbon dioxide are respectively about 7.4 MPa and about 31° C., and thus a supercritical state of carbon dioxide is easily formed. In addition, carbon dioxide is non-flammable, and therefore it is easily handled.

The compressive fluid may be used alone or in combination as a mixture.

Organic solvents such as alcohols (e.g., methanol, ethanol, and propanol), ketones (e.g., methyl ethyl ketone), toluene, ethyl acetate, and tetrahydrofurane may be added as an entrainer (co-solvent).

<<Other Components>>

Other components are not particularly limited and may be appropriately selected depending on the intended purpose. Examples thereof include a catalyst and an additive.

Examples of the additive include a surfactant and an antioxidant.

In the present invention, the polyimide precursor represented by the General Formula (3) may be discharged from an injection nozzle together with the compressive fluid at normal pressure to thereby produce polyimide precursor particles.

Also, polyimide precursor particles produced in the compressive fluid may be applied to an object together with the compressive fluid.

In this case, a surface of the object onto which the polyimide precursor particles has been applied is preferably heated at a temperature of 100° C. or higher to thereby form a film.

(Production Method of Polyimide)

A method for producing polyimide of the present invention includes a polyimide precursor production step and a polyimide conversion step; and, if necessary, further includes other steps.

<Polyimide Precursor Production Step>

The polyimide precursor production step is a step of reacting tetracarboxylic dianhydride represented by the following General Formula (1) with a diamine compound represented by the following General Formula (2) in a compressive fluid to thereby produce a polyimide precursor represented by the following Formula (3).

The polyimide precursor production step is the same as the method for producing a polyimide precursor of the present invention.

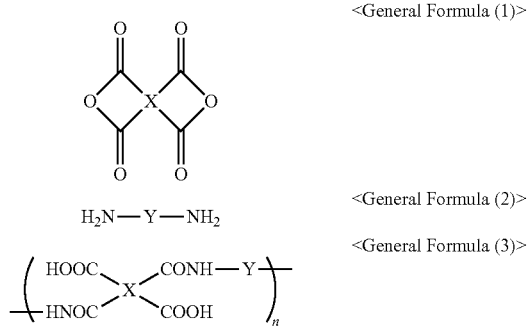

X in the General Formulae (1) and (3) denotes a tetravalent aromatic group or a tetravalent alicyclic group, Y in the General Formulae (2) and (3) denotes a divalent organic group, and n denotes the number of repetitions.

The X, Y, and n are the same as in the method for producing a polyimide precursor.

<Polyimide Conversion Step>

The polyimide conversion step is a step of heating the polyimide precursor in a compressive fluid at a temperature of 50° C. or higher to thereby convert the polyimide precursor into polyimide represented by the following General Formula (4).

The heating temperature is preferably 100° C. to 200° C., more preferably 100° C. to 180° C.

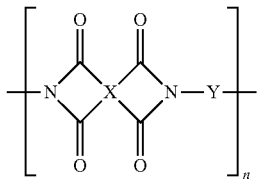

In the General Formula (4), X denotes a tetravalent aromatic group or a tetravalent alicyclic group, Y denotes a divalent organic group, and n denotes the number of repetitions.

The X, Y, and n are the same as in the method for producing a polyimide precursor.

In the present invention, the heating temperature in the step of converting the polyimide precursor into polyimide in the compressive fluid may be lower than that of known methods. This is because as follows.

Polyimide is rigid and high in heat-stability. Also, polyimide typically has a high glass transition temperature at which a molecular chain is movable. This is because, in the case where the heating temperature is lower than the glass transition temperature of the produced polyimide (in some cases, incomplete polyimide before completion of the reaction), motion of the molecular chain is suppressed as an imidation reaction proceeds, so that the motion of the molecular chain required for the imidation reaction is less likely to occur. Therefore, if polyamic acid is heated in a plasticized state and polyimide can be kept in a partially plasticized state, the imidation reaction easily proceeds at a lower temperature.

Here, because polyamic acid and polyimide used in the present invention have a carbonyl group, it is expected that they have a relatively high affinity for the compressive fluid composed of carbon dioxide which has a similar structure to the carbonyl group, so that polyamic acid and polyimide are highly plasticized.

After the resultant polyamic acid is applied onto a support (a mold for forming), polyamic acid may be inverted (imidated) into polyimide through a treatment such as heating.

The heating temperature during the imidation is 50° C. or higher, preferably 80° C. to 350° C., more preferably 100° C. to 300° C. When the heating temperature is lower than 50° C., satisfactory polyimide cannot be produced due to insufficient reaction progress. Additionally, the tertiary amine adversely remains, potentially leading to occurrence of odor and stickiness.

The hearing period is not particularly limited and may be appropriately selected depending on the intended purpose, but is preferably 30 seconds to 10 hours, more preferably 5 min to 5 hours.

According to the present invention, a polyimide film can be produced by forming a polyimide precursor in the compressive fluid (in particular, supercritical carbon dioxide), taking out the resultant polyimide precursor in a state of a dispersion or particles into a low boiling point solvent, applying it onto a support, and heating at the above-described heating temperature.

According to the method for producing polyimide of the present invention, a resin finished article containing only a small amount of a residual solvent and impurity can be provided. In the method, a high boiling point solvent is not used, or, if used, used in only a small amount as an additive. Note that, the high boiling point solvent in the present invention refers to a solvent having a boiling point of 200° C. or higher; and the low boiling point solvent refers to a solvent having a boiling point of 100° C. or lower.

A weight average molecular weight of polyimide produced in the present invention is not particularly limited and may be appropriately selected depending on the intended purpose, but is preferably 3,000 to 1,000,000, more preferably 3,000 to 500,000.

Polyimide produced in the present invention is suitably used for a frictional part spacer, metal, an alternate material of ceramics, a film, a varnish, an adhesive, and a bulk molding material, which needs an insulating property and heat resistance.

In the present invention, tetracarboxylic dianhydride represented by the General Formula (1) is subjected to a (polyaddition) reaction with a diamine compound represented by the General Formula (2) in a compressive solvent to thereby produce polyamic acid. The resultant polyamic acid is discharged from an injection nozzle at normal pressure to thereby produce polyamic acid particles. Alternatively, the polyamic acid is heated in the compressive fluid to thereby convert it into polyimide. Thereafter, the polyimide may be discharged from an injection nozzle at normal pressure to thereby produce polyimide particles.

The polyimide precursor particles and the polyimide particles of the present invention allows a surface to be coated with polyimide by applying the particles in a powder state or as a dispersion in a low boiling point solvent onto the surface, followed by heating.

A volume average particle diameter of polyimide particles or polyimide precursor particles produced in the present invention is not particularly limited and may be appropriately selected depending on the intended purpose, but is preferably 3 m to 500 µm.

Here, a producing device used in a method for producing a polyimide precursor and a method for producing polyimide of the present invention will be described with reference to figures.

Figure 3:
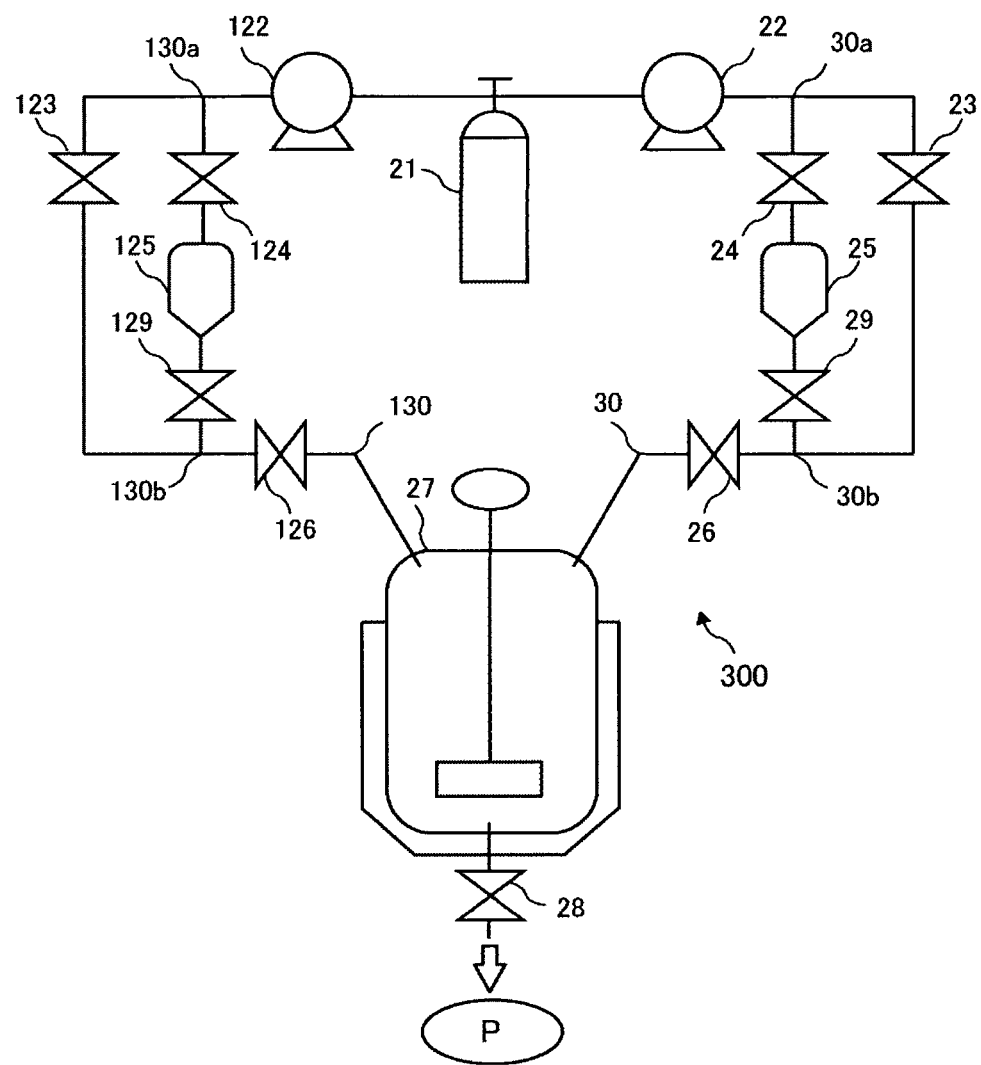
FIG. 3 is a system diagram showing one exemplary batch-type polymerization reactor.

First, a polymerization reactor used in a batch manner will be described. In the system diagram of FIG. 3, a polymerization reactor 300 contains a tank 21, a metering pump 22, an addition pot 25, a reaction vessel 27, and valves (23, 24, 26, 28, and 29). They are connected with each other via a pressure resistant pipe 30, as illustrated in FIG. 3. Moreover, couplings (30a and 30b) are provided to the pipe 30.

Meanwhile, a pipe 130 provided with an addition pot 125, valves (123, 124, 126, and 129), and couplings (130a and 130b); a metering pump 122, and an addition pot 125 are provided.

The tank 21 stores a compressive fluid. Note that, the tank 21 may contain gas or solid that is transformed into the compressive fluid upon application of heat or pressure in a supply path through which it is supplied to the reaction vessel 27, or in the reaction vessel 27. In this case, the gas or solid stored in the tank 21 is transformed into the state of (1), (2), or (3) in the phase diagram of FIG. 2 in the reaction vessel 27 by applying heat or pressure.

The metering pump 22 supplies the compressive fluid stored in the tank 21 to the reaction vessel 27 at constant pressure and flow rate. The addition pot 25 stores tetracarboxylic dianhydride represented by the General Formula (1). By opening and closing each of the valves (23, 24, 26, and 29), the path is switched between a path for supplying the compressive fluid stored in the tank 21 to the reaction vessel 27 via the addition pot 25, and a path for supplying the compressive fluid to the reaction vessel 27 without passing through the addition pot 25.

The metering pump 122 supplies the compressive fluid stored in the tank 21 to the reaction vessel 27 at constant pressure and flow rate. The addition pot 125 stores a diamine compound (and tertiary amine) represented by the General Formula (2). By opening and closing each of the valves (123, 124, 126, and 129), the path is switched between a path for supplying the compressive fluid stored in the tank 21 to the reaction vessel 27 via the addition pot 125, and a path for supplying the compressive fluid to the reaction vessel 27 without passing through the addition pot 125.

The reaction vessel 27 is a pressure resistant vessel configured to bring the compressive fluid supplied from the tank 21, the tetracarboxylic dianhydride supplied from the addition pot 25, and the diamine compound supplied from the addition pot 125 into contact with each other, to thereby allow tetracarboxylic dianhydride to react with the diamine compound. The reaction vessel 27 may be provided with a gas outlet for releasing evaporated materials. Moreover, the reaction vessel 27 contains a heater for heating raw materials and the compressive fluid. Further, the reaction vessel 27 contains a stirring device for stirring the raw materials and compressive fluid. The stirring device can realize a uniform and quantitative polymerization reaction as it can prevent sedimentation of the resultant reaction product caused by a difference in concentration between the raw materials and the resultant reaction product. The valve 28 discharges the polymer product P in the reaction vessel 27 by opening after the completion of the polymerization reaction.

Figure 4:
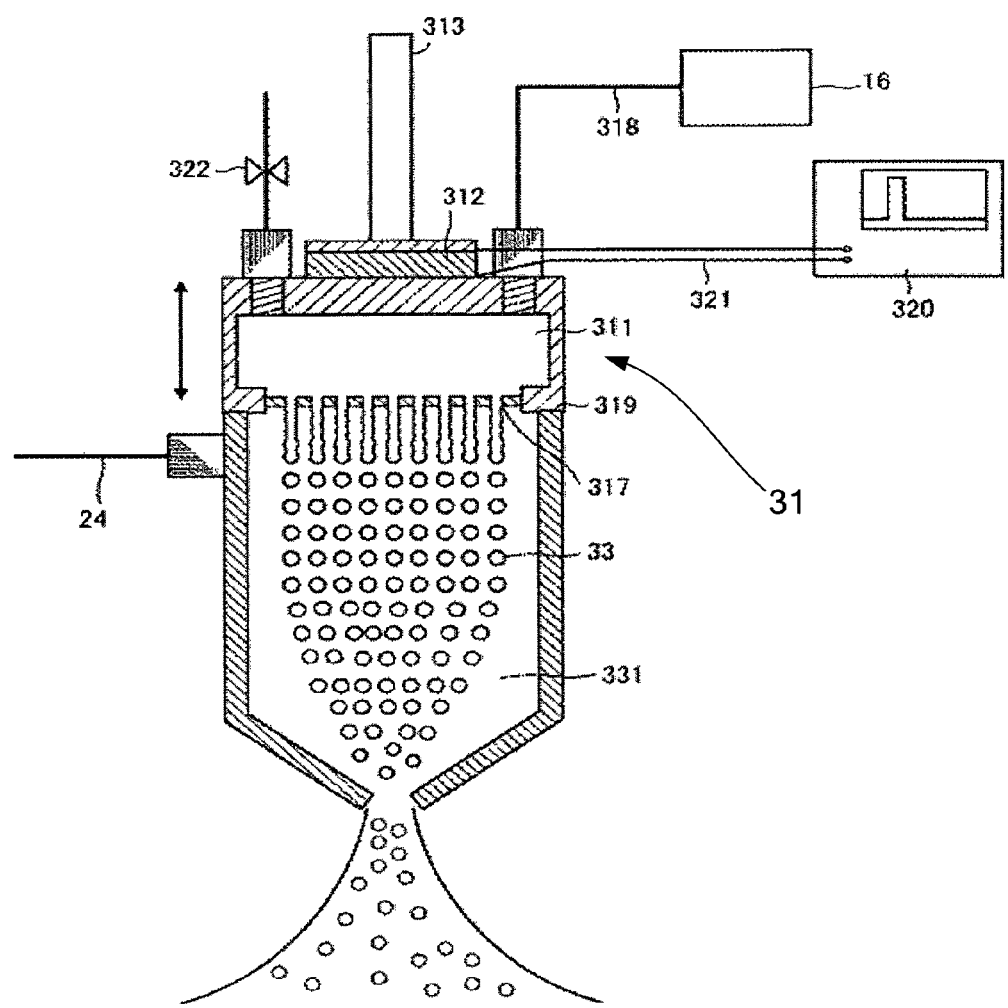
FIG. 4 is a schematic diagram showing one exemplary discharging device.

Next, a discharging device 31 and a particle forming section 331 will be described with reference to FIG. 4. FIG. 4 is a schematic diagram showing one exemplary discharging device 31 and particle forming section 331.

The discharging device 31 contains a reservoir 311 configured to reserve a reaction product, one or more through-holes 317 formed on a part of a wall of the reservoir 311, a vibrating unit 312 provided so as to be in contact with the reservoir 311 in order to apply vibration to the through-holes 317, a signal generator 320 connected with the vibrating unit 312 via an electroconductive wire 321, and a supporting unit 313 configured to hold the vibrating unit 312.

In the discharging device 31, one or more through-holes 317 are provided relative to one vibrating unit 312. The vibrating unit 312 is provided so as to be in contact with the reservoir 311 in order to apply vibration to the through-holes 317. Such configuration allows the reservoir 311 and the through-holes 317 to be vibrated from outside while the vibrating unit 312 is placed under a normal pressure environment. That is, a high pressure fluid can be pulverized into particles without using a special vibrating unit.

Example of the discharging device 31 includes a device containing a reaction product supplying unit 16 configured to quantitatively supply to the reservoir 311 a reaction product (polyamic acid or a polyimide resin) to be discharged through the through-holes 317, as shown in FIG. 4.

In the case where it is connected to the polymerization reactor 300 shown in FIG. 3 to continuously produce polyamic acid particles or polyimide particles, instead of the reaction product supplying unit 16, the reaction container 27 of the polymerization reactor 300 shown in FIG. 3 may be connected to the reservoir 311 via a valve 28 and a pipe 318 to supply the reaction product.

Each of the units now will be described in more detail. Note that, in FIG. 4, reference sign 33 denotes particles.

The reservoir 311 and a pipe for connecting the reservoir 311 is formed of a metal member such as SUS (stainless steel) preferably having a pressure resistance of about 30 MPa because the reaction product is required to be kept in a highly pressurized state. The reservoir 311 is connected with a pipe 318 configured to supply the reaction product, and preferably contain a mechanism 319 configured to hold a plate on which the through-holes 317 are formed. The vibrating unit 312 configured to vibrate the entire reservoir 311 is in contact with the reservoir 311. The vibrating unit 312 is preferably connected with the signal generator 320 via the electroconductive wire 321 so that its vibration is controlled by signal generated by the signal generator 320. The reservoir 311 is preferably provided with an open valve 322 in order to adjust internal pressure thereof, from the viewpoint of stable formation of a columnar reaction product.

From the viewpoint of uniform application of vibration, the entire reservoir 311 containing the through-holes 317 is preferably vibrated by one vibrating unit 312. The vibrating unit 312 configured to vibrate the reservoir 311 is not particularly limited and may be appropriately selected, as long as it can surely apply vibration preferably at a constant number of vibrations (may be referred to as frequency). The vibrating unit 312 is preferably formed of a piezoelectric material in order to vibrate the through-holes at a constant frequency through contraction.

The piezoelectric material has a function to convert electric energy to mechanical energy. Specifically, the piezoelectric material can be contracted by applying voltage to thereby vibrate the through-holes. Example of the type of the piezoelectric material includes piezoelectric ceramics such as lead zirconate titanate (PZT), which is often used in the form of laminate because it typically has a small displacement amount. Other types of the piezoelectric material include piezoelectric polymer (e.g., polyvinylidene fluoride (PVDF)), and a single crystal of quartz, $LiNbO_3$, $LiTaO_3$, or $KNbO_3$.

A frequency of the signal applied to the piezoelectric material is not particularly limited and may be appropriately selected depending on the intended purpose, but is preferably 20 kHz to 10 MHz, more preferably 50 kHz to 1 MHz from the viewpoint of production of fine reaction product particles having extremely uniform particle diameters. When the frequency is less than 20 kHz, productivity may be deteriorated. When the frequency is more than 10 MHz, particle diameter controlling property may be deteriorated.

The vibration unit 312 is in contact with the reservoir 311, and the reservoir 311 holds a plate on which the through-holes 317 are formed. The vibration unit 312 is most preferably arranged in parallel to the wall of the reservoir 311 on which the through-holes 317 are formed, from the viewpoint of uniformly applying vibration to a columnar body discharged through the through-holes 317. Even though the wall of the reservoir deforms in the course of vibration, the inclination therebetween is preferably 10° or less. From the viewpoint of further improvement of productivity, it is preferred to provide a plurality of the reservoirs 311 each including the vibration unit 312.

The supporting unit 313 is provided to fix the reservoir 311 and the vibration unit 312 to the discharge device 31. The material of the supporting unit 313 is not particularly limited and may be appropriately selected depending on the intended purpose, but it is preferably rigid, such as metal. If necessary, for example, a rubber material or a resin material as a vibrational relaxation material may be partly provided in order to prevent disturbance of the vibration of the reservoir caused by excess sympathetic vibration.

The through-hole 317 is a space through which the reaction product supplied from the reaction product supplying unit 16 is discharged in a columnar form. The material of a member in which the through-holes 317 are formed is not particularly limited and may be appropriately selected depending on the intended purpose. Examples thereof include stainless steel (SUS), nickel, copper, aluminum, iron, and titanium. Among them, stainless steel (SUS) and nickel are preferred, in terms of corrosion resistance.

The thickness of the member in which the through-holes 317 are formed is not particularly limited and may be appropriately selected depending on the intended purpose, but it is preferably 5 µm to 100 µm. When the thickness is more than 100 µm, it may be difficult to form the through-holes 317 in the member. When the thickness is less than 5 µm, the member may be broken due to a difference in pressure between the reservoir 311 and the particle forming section 331. Note that, the thickness of the member is not limited to the above-mentioned range, as long as the through-holes 317 can be formed therein, and sufficient durability can be obtained depending on the material of the member.

The opening diameter of the through-hole 317 is not particularly limited, as long as the pressure upon discharging can maintain at a constant level. When the opening diameter of the through-hole is excessively small, the through-hole 317 is easily clogged with the reaction product, and it may be difficult to obtain desired particles. The upper limit of the opening diameter of the through-hole is not limited, and the lower limit thereof is preferably 2 µm or larger, more preferably 5 µm or larger, particularly preferably 8 µm or larger. Note that, the opening diameter means a diameter of the through-hole 317 when the through-hole is circular, and a minor axis of the through-hole 317 when the through-hole is elliptic.

The particles can be produced even when only one through-hole 317 is provided. However, from the viewpoint of effectively producing the particles having extremely uniform diameters, it is preferred that a plurality of through-holes 317 be provided. The number of the through-holes 317 per one reservoir 311, to which the vibration is applied with one vibration unit 312, is preferably 10 to 10,000, more preferably 10 to 1,000 from the viewpoint of productivity and controllability, and in order to surely produce fine particles having extremely uniform diameters. Note that, from the viewpoint of operability, the number of the through-holes 317 operated by one vibration unit 312, namely, the number of the through-holes 317 formed in one reservoir 311 is preferably as large as possible. However, when the number of thereof is large without restriction, uniformity of the particle diameters may not be maintained.

EXAMPLES

Examples of the present invention now will be described, but the present invention is not limited thereto.
<Polyimide Precursor and Polyimide Producing Device>
(1) The batch type polymerization reactor 300 shown in FIG. 3 was used to allow tetracarboxylic dianhydride to react with a diamine compound. A configuration of the polymerization reactor 300 is as follows.

Tank 21: Carbon dioxide bottle

Addition pot 25: A pipe formed of SUS316 (¼ inch) sandwiched between valves (24 and 29) was used as the addition pot. The addition pot was charged with tetracarboxylic dianhydride, which was in a fluid state by the action of supercritical carbon dioxide.

Addition pot 125: A pipe formed of SUS316 (¼ inch) sandwiched between valves (124 and 129) was used as the addition pot. The addition pot was charged with a diamine compound (and tertiary amine), which was in a fluid state by the action of supercritical carbon dioxide.

Reaction container 27: A 100 mL pressure resistant container formed of SUS316 (pressure resistance: 68 MPa) was used. In this reaction container, tetracarboxylic dianhydride and a diamine compound (and tertiary amine) may be reacted with each other in supercritical carbon dioxide or heated to thereby cause imidation reaction.

(2) Particles were prepared at normal pressure using the discharging device 31 shown in FIG. 4.

The reaction product was directly introduced from the reaction container 27 of FIG. 3 to the discharging device 31 shown in FIG. 4 to thereby discharge polyamic acid particles or polyimide particles. That is, the reaction container 27 of the polymerization reactor shown in FIG. 3 was connected with the reservoir 311 through the valve 28 and the pipe 318 to thereby discharge polyamic acid particles or polyimide particles.

(3) The resultant polyamic acid particles or polyimide particles were analyzed by FT-IR spectrum analysis method (manufactured by PerkinElmer, Inc., FT-IR SPECTRUM ONE). As a result, polyamic acid was found to have a peak at 1,650 cm$^{-1}$, and, with respect to polyimide, the peak at 1,650 cm$^{-1}$ was disappeared and a peak at 1,380 cm$^{-1}$ was newly produced.
(4) The polyamic acid particles were directly applied onto a glass substrate by discharging from the discharging device 31 in (2).
(5) The polyimide particles were directly applied onto a glass substrate by discharging from the discharging device 31 in (2).

Example 1

Production of Polyimide Precursor

—Polymerization of Polyamic Acid—
Benzene tetracarboxylic dianhydride represented by the General Formula (1) shown in Table 1 (manufactured by Tokyo Chemical Industry Co., Ltd.) and 3,4'-diaminodiphenyl ether (manufactured by Tokyo Chemical Industry Co., Ltd.) serving as a diamine compound represented by the General Formula (2) were charged into the addition pot 25 and the addition pot 125 of the polymerization reactor 300 shown in FIG. 3, respectively. Then, they were made into a supercritical carbon dioxide fluid state at 50° C. and 10 MPa. The benzene tetracarboxylic dianhydride and 3,4'-diaminodiphenyl ether were mixed together at 1:1 (mol/mol) for 10 min, followed by allowing to react for 1 hour. After 1 hour, polyamic acid particles were discharged from the reaction container 27 of the polymerization reactor shown in FIG. 3 to the discharging device 31 shown in FIG. 4 by allowing the reaction product to pour via the nozzle 28 and the pipe 318 into a reservoir 311.
The resultant polyamic acid particles were measured by the Fourier transform infrared spectroscopy (FT-IR method), so that an absorption derived from an amide bond at 1,650 cm$^{-1}$ was observed.

Examples 2 to 4

Production of Polyimide Precursor

—Polymerization of Polyamic Acid—
Polyamic acid particles of Examples 2 to 4 were produced in the same manner as in Example 1, except that conditions described in Table 1-1 were used.

Examples 5 to 7

Production of Polyimide Precursor

—Polymerization of Polyamic Acid—
Polyamic acid particles of Examples 5 to 7 were produced in the same manner as in Example 1, except that tertiary amine (TEA) (manufactured by Tokyo Chemical Industry Co., Ltd.) described in Table 1-2 was added.

Examples 8 to 11

Production of Polyimide

—Conversion into Polyimide—
Subsequent to the polymerization of polyamic acid in Examples 1 to 4, the supercritical carbon dioxide state at 10 MPa was maintained for 2 hours at an imidation temperature described in Table 1-2 (150° C. to 200° C.), from which supernatant water was appropriately removed along with $CO_2$ in an upper portion of the reactor in a stop and flow manner, to thereby convert the polyamic acid into polyimide. Thus, polyimide particles of Examples 8 to 11 were produced.

Examples 12 to 14

Production of Polyimide

—Conversion into Polyimide—
Polyimide particles of Examples 12 to 14 were produced in the same manner as in Examples 8 to 11, except that subsequent to the polymerization of polyamic acid in Examples 5 to 7, the temperature was changed to the imidation temperature (100° C. to 150° C.) described in Table 1-2, to thereby convert the polyamic acid into polyimide.

Example 15

Application and Film Formation of Polyamic Acid Particles

Polyamic acid particles of Example 7 were applied onto a glass substrate, followed by heating (imidating) at 150° C. for 2 hours to thereby produce a polyimide film.

Example 16

Application and Membrane Formation of Polyamic Acid Particles

Polyamic acid particles of Example 11 were applied onto a glass substrate, followed by heating (imidating) at 150° C. for 2 hours to thereby produce a polyimide film.

Comparative Example 1

In Example 7, polymerization was performed in 20% by mass of N-methylpyrrolidone (NMP, boiling point: 202° C.) (manufactured by Tokyo Chemical Industry Co., Ltd.) to thereby synthesize a polyimide precursor. The resultant polyimide precursor solution was applied onto a glass substrate, followed by heating at 150° C. for 2 hours to thereby produce a polyimide film.
In the resultant polyimide film, almost no imidation reaction proceeded and NMP remains, which caused stickiness.

Comparative Example 2

Polymerization was attempted in the same manner as in Example 1, except that terephthalic acid (manufactured by Tokyo Chemical Industry Co., Ltd.) and 2,2-bis(4-hydroxyphenyl)propane (manufactured by Tokyo Chemical Industry Co., Ltd.) were used instead of the tetracarboxylic dianhydride and the diamine, respectively. However, the polymerization reaction did not proceed.
The reason why the reaction did not proceed in Comparative Example 2 will be described compared to the reactions in Examples. With respect to the production of polyester of Comparative Example 2, dehydration condensation must proceed in order to allow the polymerization reaction to proceed, so that the polymerization reaction does not proceed. Meanwhile, in the case of the polyimide of Examples, the polymerization can proceed through an addition reaction of the diamine to the tetracarboxylic dianhydride to thereby produce polyamic acid. Additionally, the imidation reaction is an intramolecular reaction, so that a polymer chain is plasticized by the compressive fluid. Therefore, conversion into polyimide proceeds as long as the polymer chain is movable.

Comparative Example 3

Polymerization was attempted in the same manner as in Comparative Example 2, except that 1,6-hezamethylene diamine (manufactured by Tokyo Chemical Industry Co., Ltd.) was used instead of 2,2-bis(4-hydroxyphenyl)propane. However, polymer was not produced.

TABLE 1-1

|  | Tetracarboxylic dianhydride represented by General Formula (1) | | | Diamine compound represented by General Formula (2) | | |
|---|---|---|---|---|---|---|
|  | X | Formula weight | Number of moles charged | Y | Formula weight | Number of moles charged |
| Example 1 | X-1 | 218.116 | 0.04 | Y-1 | 200.236 | 0.04 |
| Example 2 | X-2 | 294.208 | 0.04 | Y-2 | 334.266 | 0.04 |
| Example 3 | X-3 | 444.238 | 0.04 | Y-3 | 518.45 | 0.04 |
| Example 4 | X-4 | 426.524 | 0.04 | Y-4 | 248.524 | 0.04 |
| Example 5 | X-1 | 218.116 | 0.04 | Y-1 | 200.236 | 0.04 |
| Example 6 | X-1 | 218.116 | 0.02 | Y-3 | 518.45 | 0.04 |
|  | X-3 | 444.238 | 0.02 |  |  |  |
| Example 7 | X-3 | 444.238 | 0.04 | Y-2 | 334.266 | 0.02 |
|  |  |  |  | Y-3 | 518.45 | 0.02 |
| Example 8 | X-1 | 218.116 | 0.04 | Y-1 | 200.236 | 0.04 |
| Example 9 | X-2 | 294.208 | 0.04 | Y-2 | 334.266 | 0.04 |
| Example 10 | X-3 | 444.238 | 0.04 | Y-3 | 518.45 | 0.04 |
| Example 11 | X-4 | 426.524 | 0.04 | Y-4 | 248.524 | 0.04 |
| Example 12 | X-1 | 218.116 | 0.04 | Y-1 | 200.236 | 0.04 |
| Example 13 | X-1 | 218.116 | 0.02 | Y-3 | 518.45 | 0.04 |
|  | X-3 | 444.238 | 0.02 |  |  |  |
| Example 14 | X-3 | 444.238 | 0.04 | Y-2 | 334.266 | 0.02 |
|  |  |  |  | Y-3 | 518.45 | 0.02 |
| Example 15 | X-3 | 444.238 | 0.04 | Y-2 | 334.266 | 0.02 |
|  |  |  |  | Y-3 | 518.45 | 0.02 |
| Example 16 | X-4 | 426.524 | 0.04 | Y-4 | 248.524 | 0.04 |
| Comparative Example 1 | X-3 | 444.238 | 0.04 | Y-2 | 334.266 | 0.02 |
|  |  |  |  | Y-3 | 518.45 | 0.02 |

TABLE 1-2

|  | Tertiary amine | | | Imidation temperature (° C.) |
|---|---|---|---|---|
|  | Type | Formula weight | Number of moles charged |  |
| Example 1 | — | — | — | — |
| Example 2 | — | — | — | — |
| Example 3 | — | — | — | — |
| Example 4 | — | — | — | — |
| Example 5 | TEA | 101.19 | 0.08 | — |
| Example 6 | TEA | 101.19 | 0.1 | — |
| Example 7 | TEA | 101.19 | 0.08 | — |
| Example 8 | — | — | — | 200 |
| Example 9 | — | — | — | 180 |
| Example 10 | — | — | — | 160 |
| Example 11 | — | — | — | 150 |
| Example 12 | TEA | 101.19 | 0.08 | 150 |
| Example 13 | TEA | 101.19 | 0.1 | 120 |
| Example 14 | TEA | 101.19 | 0.08 | 100 |
| Example 15 | TEA | 101.19 | 0.08 | 150 |
| Example 16 | — | — | — | 150 |
| Comparative Example 1 | — | — | — | 150 |

Abbreviations in Tables 1-1 and 1-2 will be described in detail.

*TEA: triethylamine

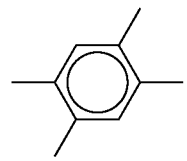
X-1

-continued

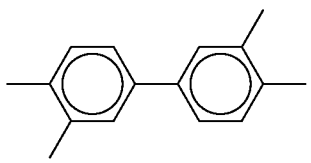
X-2

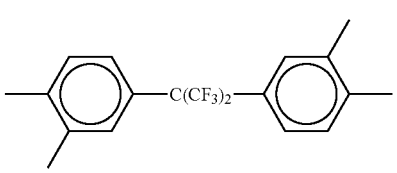
X-3

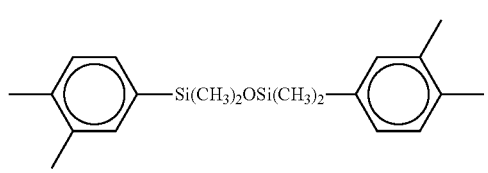
X-4

-continued

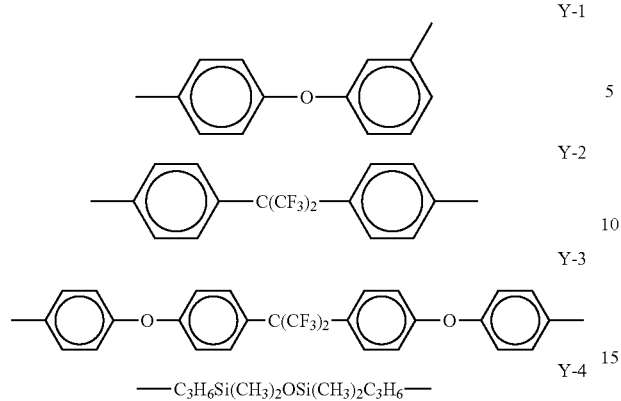

Embodiments of the present invention are as follows.
<1> A method for producing a polyimide precursor, including:
reacting tetracarboxylic dianhydride represented by the following General Formula (1) with a diamine compound represented by the following General Formula (2) in a compressive fluid to thereby produce a polyimide precursor represented by the following Formula (3):

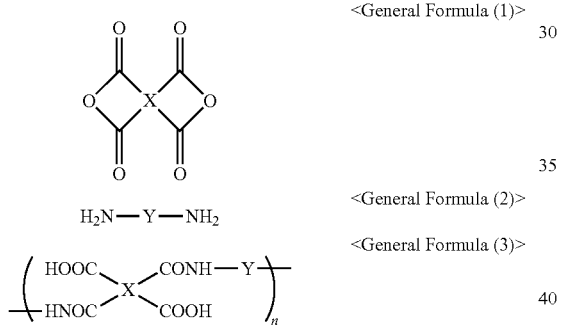

where, X in the General Formulae (1) and (3) denotes a tetravalent aromatic group or a tetravalent alicyclic group, Y in the General Formulae (2) and (3) denotes a divalent organic group, and n denotes the number of repetitions.
<2> The method for producing a polyimide precursor according to <1>, wherein an active hydrogen-free tertiary amine is contained in the compressive fluid.
<3> The method for producing a polyimide precursor according to <1> or <2>, wherein the polyimide precursor represented by the following General Formula (3) contains a fluorine atom, a siloxane group, or both thereof.
<4> The method for producing a polyimide precursor according to any one of <1> to <3>, wherein the compressive fluid is supercritical carbon dioxide.
<5> The method for producing a polyimide precursor according to any one of <1> to <4>, wherein the polyimide precursor represented by the following General Formula (3) is discharged from an injection nozzle together with the compressive fluid at normal pressure to thereby produce polyimide precursor particles.
<6> A method for producing polyimide, including:
reacting tetracarboxylic dianhydride represented by the following General Formula (1) with a diamine compound represented by the following General Formula (2) in a compressive fluid to thereby produce a polyimide precursor represented by the following General Formula (3), and
heating the polyimide precursor in the compressive fluid at a temperature of 50° C. or higher to thereby convert the polyimide precursor into polyimide represented by the General Formula (4):

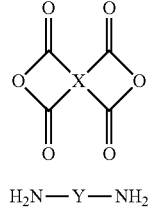

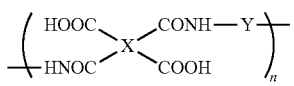

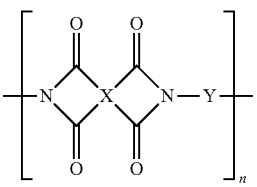

where, X in the General Formulae (1), (3), and (4) denotes a tetravalent aromatic group or a tetravalent alicyclic group, Y in the General Formulae (2) to (4) denotes a divalent organic group, and n denotes the number of repetitions.
<7> The method for producing polyimide according to <6>, wherein an active hydrogen-free tertiary amine is contained in the compressive fluid.
<8> The method for producing polyimide according to <6> or <7>, wherein the polyimide precursor represented by the following General Formula (3) contains a fluorine atom, a siloxane group, or both thereof.
<9> The method for producing polyimide according to any one of <6> to <8>, wherein the compressive fluid is supercritical carbon dioxide.
<10> The method for producing polyimide according to any one of <6> to <9>, wherein the polyimide represented by the following General Formula (4) is discharged from an injection nozzle together with the compressive fluid at normal pressure to thereby produce polyimide particles.
<11> A method for applying a polyimide precursor, including:
applying polyimide precursor particles produced in a compressive fluid onto an object together with the compressive fluid.
<12> A method for forming a polyimide precursor into a film, including:
heating an applied surface of an object onto which polyimide precursor particles have been applied by the method according to <11> at a temperature of 100° C. or higher, to thereby form a film.
<13> A method for forming polyimide into a film, including:
applying the polyimide particles produced by the method according to <10> onto an object, followed by heating the object at a temperature of 200° C. or higher, to thereby form a film.

REFERENCE SIGNS LIST

21 Tank
25 Addition pot
27 Reaction container
31 Discharging device
125 Addition pot
300 Polymerization reactor
311 Reservoir
312 Vibrating unit
317 Through-hole
P Reaction product

The invention claimed is:

1. A method for producing a polyimide precursor, comprising:
reacting tetracarboxylic dianhydride represented by the following General Formula (1) with a diamine compound represented by the following General Formula (2) in a compressive fluid to thereby produce a polyimide precursor represented by the following General Formula (3):

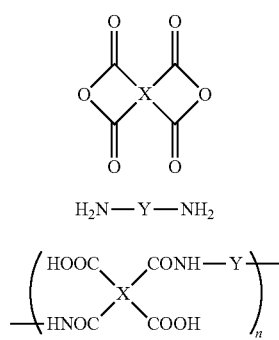

<General Formula (1)>

$H_2N-Y-NH_2$ <General Formula (2)>

<General Formula (3)> wherein, X in the General Formulae (1) and (3) denotes a tetravalent aromatic group or a tetravalent alicyclic group, Y in the General Formulae (2) and (3) denotes a divalent organic group, and n denotes the number of repetitions, and the compressive fluid contains an active hydrogen-free tertiary amine, and the active hydrogen-free tertiary amine is at least one selected from the group consisting of tri-ethylamine, tripropylamine, tributylamine, N-methimorpholine, 1,4-diazabicyclo[2,2,2] octane and diazabicycloundecene; and discharging the polyimide precursor, represented by the General Formula (3), from an injection nozzle together with the compressive fluid at normal pressure to thereby produce polyimide precursor particles.

2. The method for producing a polyimide precursor according to claim 1, wherein the polyimide precursor represented by the following General Formula (3) contains a fluorine atom, a siloxane group, or both thereof.

3. The method for producing a polyimide precursor according to claim 1, wherein the compressive fluid is supercritical carbon dioxide.

4. A method for applying a polyimide precursor, comprising:
discharging the polyimide precursor from an injection nozzle together with a compressive fluid at normal pressure to thereby produce polyimide precursor particles; and applying the polyimide precursor particles produced in the compressive fluid onto an object together with the compressive fluid, wherein the compressive fluid contains an active hydrogen-free tertiary amine, and the active hydrogen-free tertiary amine is at least one selected from the group consisting of tri-ethylamine, tripropylamine, tributylamine, N-methimorpholine, 1,4-diazabicyclo[2,2,2] octane and diazabicycloundecene.

* * * * *